United States Patent [19]

Nishimiya

[11] Patent Number: 4,821,252

[45] Date of Patent: Apr. 11, 1989

[54] INFORMATION RECORDING AND/OR REPRODUCING APPARATUS

[75] Inventor: Masanobu Nishimiya, Yokohama, Japan

[73] Assignee: Ricoh Company, Ltd., Tokyo, Japan

[21] Appl. No.: 122,043

[22] Filed: Nov. 17, 1987

[30] Foreign Application Priority Data

Nov. 20, 1986 [JP] Japan ................................. 61-277735

[51] Int. Cl.$^4$ .......................... G11B 5/09; G11B 20/12
[52] U.S. Cl. ........................................ 369/48; 369/44; 369/174
[58] Field of Search ............................ 369/44, 174, 48

[56] References Cited

U.S. PATENT DOCUMENTS 4,142,208  2/1979  Oprandi et al. ...................... 358/127

FOREIGN PATENT DOCUMENTS 0054438   6/1982  European Pat. Off. .
0064196  10/1982  European Pat. Off. .

Primary Examiner—William L. Sikes
Assistant Examiner—Robert E. Wise
Attorney, Agent, or Firm—Oblon, Fisher, Spivak, McClelland & Maier

[57] ABSTRACT

An information recording and/or reproducing apparatus reproduces a pre-recorded address information from a recording medium when recording and/or reproducing a main information signal on and/or from the recording medium, where the address information is pre-recorded on substantially parallel tracks of the recording medium with a predetermined period. The information recording and/or reproducing apparatus comprises a first circuit for producing a reproduced signal by scanning one track on the recording medium, a second circuit for generating an address interval signal having a predetermined level during a time corresponding to an interval in which the address information is pre-recorded on the recording medium, and a third circuit for passing the reproduced signal from the first circuit only during the predetermined level of the address interval signal so as to obtain only the address information reproduced from the one track.

5 Claims, 4 Drawing Sheets

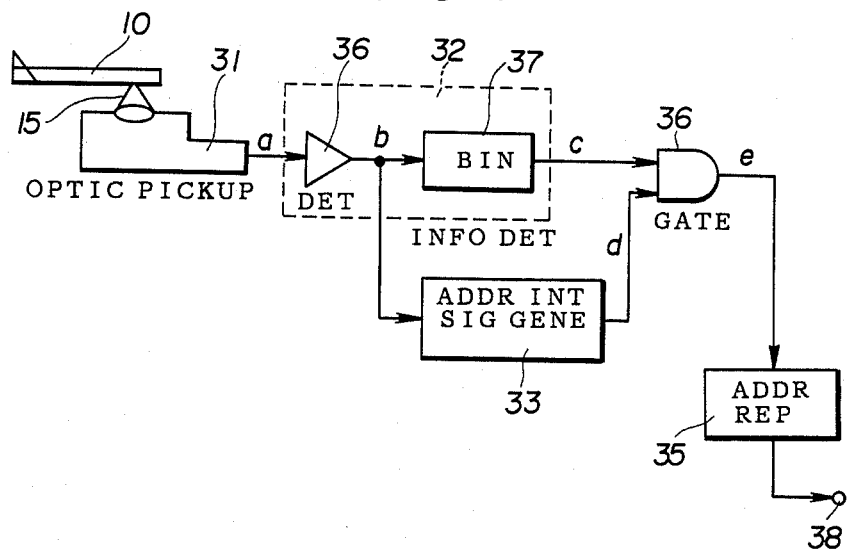
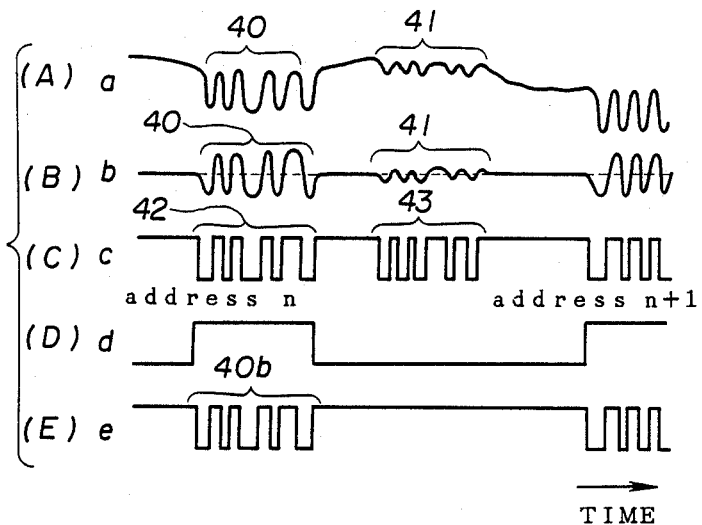

FIG.8
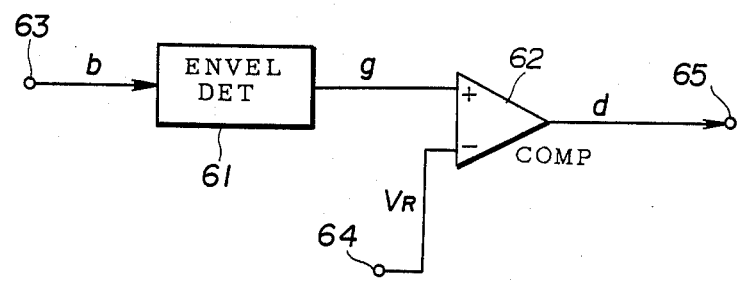
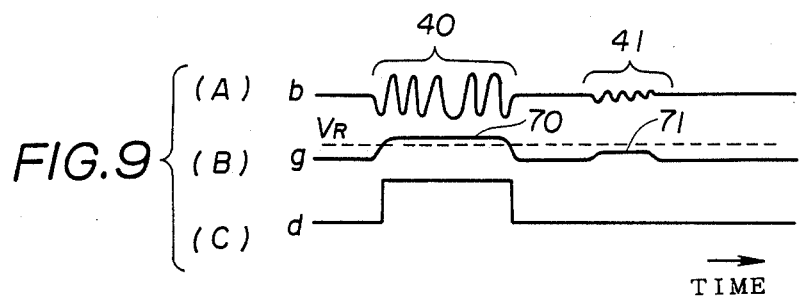
FIG.9

INFORMATION RECORDING AND/OR REPRODUCING APPARATUS

BACKGROUND OF THE INVENTION

The present invention generally relates to information recording and/or reproducing apparatuses, and more particularly to an information recording and/or reproducing apparatus which reproduces a pre-recorded address information from a recording medium when recording and/or reproducing a main information signal on and/or from the recording medium.

Generally, a recording medium such as an optical disc is pre-recorded with an address information for indicating an absolute address on the recording medium. Hence, quick access can be made to a desired address on the recording medium by detecting the pre-recorded address information.

FIG.1 shows a portion of an example of the optical disc. An optical disc 10 comprises a spiral information recording portion 11 and a spiral guide groove portion 12. Each track turn of the information recording portion 11 is provided between two successive track turns of the guide groove portion 12. An address information ADR is pre-recorded on the information recording portion 11 with a predetermined period, and the optical disc 10 is the so-called CLV (Constant Linear Velocity) disc.

FIG.2 shows a portion of the optical disc 10 on an enlarged scale. The address information ADR is pre-recorded on the information recording portion 11 as rows of intermittent pits 13, and the pre-recorded address information ADR is detected by use of a reproducing light beam which forms a light spot 15a on the optical disc 10. The light spot 15a has such a size that the information recording portion 11 and the guide groove portion 12 on both sides thereof are scanned simultaneously so that the tracking of the reproducing light beam can be controlled. The detection of the pre-recorded address information ADR is carried out based on the reflected light from the optical disc 10.

FIG. 3 shows an example of an address detecting system of the conventional information recording and/or reproducing apparatus which reproduces the pre-recorded address information ADR from the optical disc 10 when recording and/or reproducing a main information signal on and/or from the optical disc 10. The address detecting system comprises an optical pickup device 21 which scans the optical disc 10 by use of a reproducing light beam 15 which forms the light spot 15a on the optical disc 10, an information detecting circuit 22, and an address reproducing circuit 23.

When the light spot 15a of the reproducing light beam 15 scans the portion of the optical disc 10 pre-recorded with the address information ADR, the information detecting circuit 22 detects the address information ADR based on a change in the phase or reflectivity of the reflected light from the optical disc 10. The detected address information ADR is supplied to a system controller (not shown) which is a central processing unit or the like through the address reproducing circuit 23 and a terminal 26. The information detecting circuit 22 comprises a detecting circuit 24 for detecting the address information ADR based on an output source signal of the optical pickup device 21, and a binarization circuit 25 for forming a binary signal from an output detection signal of the detecting circuit 24. The information detecting circuit 22 for forming the binary signal is known, and such a circuit is disclosed in a U.S. Pat. No. 4,142,208, for example.

In order to carry out the recording of the main information signal on the optical disc 10 with a high density, a track pitch TP shown in FIG. 2 must be decreased. However, when the track pitch TP is decreased, the address information ADR pre-recorded on the adjacent track turns of the information recording portion 11 will also be reproduced as crosstalk by the light spot 15a when scanning an intended track turn of the information recording portion 11, because the light spot 15a scanning the intended track turn of the information recording portion 11 will also scan at least a part of track turns of the information recording portion 11 adjacent to the intended track turn due to the extremely short separation of two mutually adjacent track turns of the information recording portion 11.

The positions where the address information ADR is pre-recorded are not aligned along certain radial directions on the optical disc 10, since the address information ADR is pre-recorded with the predetermined period. For this reason, when the light spot 15a scans a part of a certain track turn of the information recording portion 11 not pre-recorded with the address information ADR, the address information ADR pre-recorded on a track turn of the information recording portion 11 adjacent to the certain track turn may be reproduced as crosstalk. In other words, during a scanning time of the certain track turn of the information recording portion 11, the address information ADR reproduced as crosstalk from the adjacent track will be detected by the detecting circuit 24 during an interval in which no address information ADR should originally be reproduced from the certain track.

Therefore, the conventional address reproducing system suffers a disadvantage in that the information detecting circuit 22 will also detect as the address information ADR the address information ADR reproduced as crosstalk from the track turn adjacent to the intended track turn of the information recording portion 11. When making access to a certain address on the optical disc 10, the reproducing light beam 15 from the optical pickup device 21 will jump to a track turn in error based on the erroneous address information which is reproduced as crosstalk, and it is impossible to make access to the certain address. There is a possibility that the certain address will be reached by chance even when the erroneous address information reproduced as crosstalk is detected by the information detecting circuit 22, but the access time will most likely be extremely long.

SUMMARY OF THE INVENTION

Accordingly, it is a general object of the present invention to provide a novel and useful information recording and/or reproducing apparatus in which the disadvantages described heretofore are overcome.

Another and more specific object of the present invention is to provide an information recording and/or reproducing apparatus which can make accurate access to a desired address on a recording medium even when the recording medium is designed for the high density recording, that is, even when the track pitch is extremely small.

Still another object of the present invention is to provide an information recording and/or reproducing apparatus which reproduces a pre-recorded address information from a recording medium when recording and/or reproducing a main information signal on and/or from the recording medium, where the address information is pre-recorded on substantially parallel tracks of the recording medium with a predetermined period. The information recording and/or reproducing apparatus comprises a first circuit for producing a reproduced signal by scanning one track on the recording medium, a second circuit for generating an address interval signal having a predetermined level during a time corresponding to an interval in which the address information is pre-recorded on the recording medium, and a third circuit for passing the reproduced signal from the first circuit only during the predetermined level of the address interval signal so as to obtain only the address information reproduced from the one track. According to the apparatus of the present invention, it is possible to eliminate the undesirable effects of the address information which is reproduced as crosstalk from the adjacent track especially when the recording density of the recording medium is increased. Hence, it is possible to accurately detect the address information pre-recorded on the recording medium, and the access speed to a desired address on the recording medium is improved. In addition, the recording density of the recording medium can be increased without being affected by the crosstalk component caused thereby.

Other objects and further features of the present invention will be apparent from the following detailed description when read in conjunction with the accompanying drawings.

BRIEF DESCRIPTION OF THE DRAWINGS

FIG. 4 is a system block diagram showing an embodiment of the address detecting system of the information recording and/or reproducing apparatus according to the present invention;

FIGS. 5(A) through 5(E) show signal waveforms for explaining the operation of the block system shown in FIG. 4;

FIG. 8 is a system block diagram showing a second embodiment of the address interval signal generating circuit in the block system shown in FIG. 4;

FIGS. 9(A) through 9(C) show signal waveforms for explaining the operation of the address interval signal generating circuit shown in FIG. 8.

DETAILED DESCRIPTION

Figure 1:
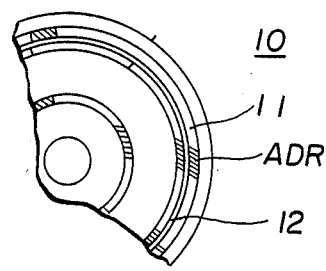
FIG. 1 is a plan view showing a portion of an example of the optical disc.

FIG. 4 shows an embodiment of the address detecting system of the information recording and/or reproducing apparatus according to the present invention. In the present embodiment, it will be assumed for convenience' sake that the recording medium is identical to the optical disc 10 shown in FIGS. 1 and 2.

Figure 2:
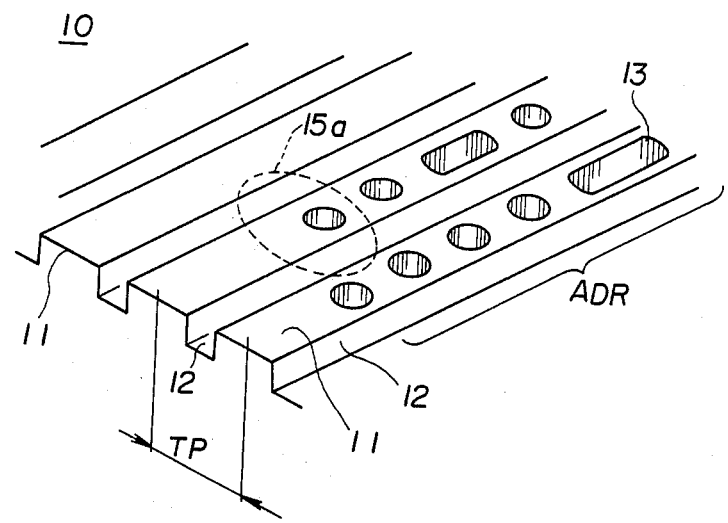
FIG. 2 is a perspective view on an enlarged scale showing a cut portion of the optical disc shown in FIG. 1.

The address reproducing system comprises an optical pickup device 31 which scans the optical disc 10 by use of the reproducing light beam 15 which forms the light spot 15a on the optical disc 10 as shown in FIG. 2 described before, an information detecting circuit 32, an address interval signal generating circuit 33, a gate (AND) circuit 34, and an address reproducing circuit 35.

When the light spot 15a of the reproducing light beam 15 scans the portion of the optical disc pre-recorded with the address information ADR, the information detecting circuit 22 detects the address information ADR based on a change in the phase or reflectivity of the reflected light from the optical disc 10. The detected address information ADR is supplied to a system controller (not shown) which is a central processing unit or the like through the gate circuit 34, the address reproducing circuit 35 and a terminal 38.

Figure 3:
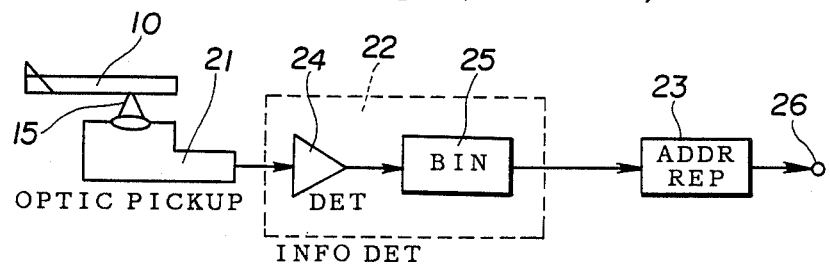
FIG. 3 is a system block diagram showing an example of the address detecting system of the conventional information recording and/or reproducing apparatus.

The information detecting circuit 32 comprises a detecting circuit 36 for detecting the address information ADR based on an output source signal of the optical pickup device 31, and a binarization circuit 37 obtains a binary signal from an output detection signal of the detecting circuit 36. The construction and operation of the optical pickup device 31, the information detecting circuit 32 and the address reproducing circuit 35 are basically the same as those of the optical pickup device 21, the information detecting circuit 22 and the address reproducing circuit 23 shown in FIG. 3.

For example, in case the optical disc 10 is only pre-recorded with the address information ADR and the main information signal is not yet recorded on the optical disc 10, a source signal a shown in FIG. 5(A) is obtained from the optical pickup device 31. As shown in FIG. 5(A), the source signal a comprises an address component 40 which is the address information ADR reproduced from an intended track turn of the information recording portion 11, and a crosstalk component 41 which is the address information ADR reproduced as crosstalk from a track turn of the information recording portion 11 adjacent to the intended track turn. The crosstalk component 41 occurs during an interval in which no address component should originally occur.

FIG. 5(B) shows a detection output b which is produced from the detecting circuit 36 by an A.C. coupling provided by a capacitor (not shown) of the detecting circuit 36 responsive to the source signal a, and this detection output b also comprises the address component 40 and the crosstalk component 41. The detection output b is formed into a binary signal c shown in FIG. 5(C) in the binarization circuit 37. As shown in FIG. 5(C), the binary signal c comprises an address component 42 and crosstalk component 43. For example, the two successive address components 42 shown respectively indicate addresses n and n+1, and the crosstalk component 41 occurs between the two successive address components 42 indicating the successive addresses n and n+1. The binary signal c is supplied to the gate circuit 34.

On the other hand, the detection output b from the detecting circuit 36 is also supplied to the address interval signal generating circuit 33, and an output address interval signal d shown in FIG. 5(D) of the address interval signal generating circuit 33 is supplied to the gate circuit 34.

Figure 6:
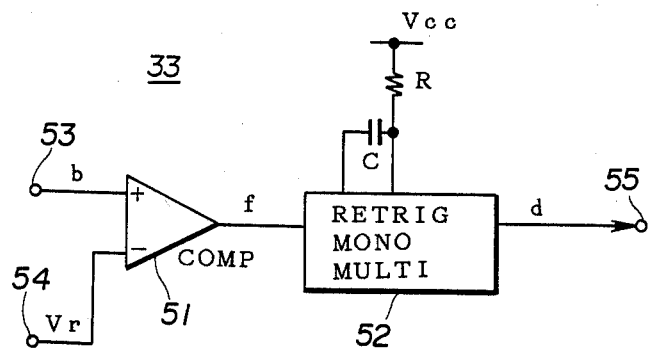
FIG. 6 is a system block diagram showing a first embodiment of an address interval signal generating circuit in the block system shown in FIG. 4.

FIG. 6 shows a first embodiment of the address interval signal generating circuit 33. The address interval signal generating circuit 33 comprises a comparator 51, a retriggerable monostable multivibrator 52, and a capacitor C and a resistor R which are coupled to the retriggerable monostable multivibrator 52. In FIG. 6, Vcc denotes a power source voltage. The detection output b from the detecting circuit 36 is applied to one input terminal of the comparator 51 through a terminal 53, and a reference voltage $V_r$ from a reference voltage source (not shown) is applied to the other input terminal of the comparator 51 through a terminal 54. The comparator 51 outputs a binary signal f which is supplied to the retriggerable monostable multivibrator 52. The retriggerable monostable multivibrator 52 produces the address interval signal d which is supplied to the gate circuit 34 through a terminal 55.

Figure 7:
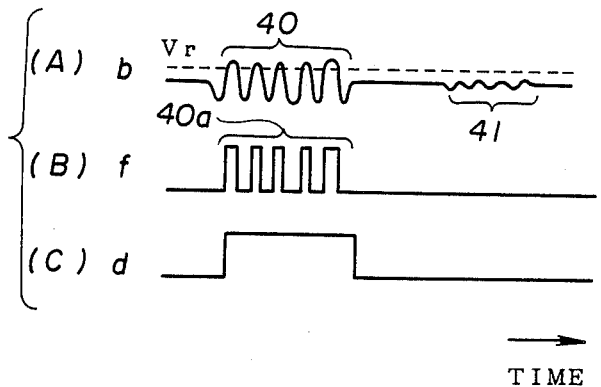
FIGS. 7(A) through 7(C) show signal waveforms for explaining the operation of the address interval signal generating circuit shown in FIG. 6.

FIG. 7(A) shows the detection output b applied to the terminal 53, and the reference voltage $V_r$ applied to the terminal 54 is indicated by a phantom line. The reference voltage $V_r$ is set to such a level that is slightly higher than the amplitude of the crosstalk component 41 but is slightly lower than the amplitude of the address component 40. Hence, the binary signal f shown in FIG. 7(B) is obtained from the comparator 51. Since the reference voltage $V_r$ is set as described above, the binary signal f includes a binary signal component 40a corresponding to the address component 40 but no binary signal component corresponding to the crosstalk component 41.

When the binary signal f shown in FIG. 7(B) is supplied to the retriggerable monostable multivibrator 52, the address interval signal d shown in FIGS. 5(D) and 7(C) is outputted from the retriggerable monostable multivibrator 52. This address interval signal d has a high level only for an interval corresponding to the binary signal component 40a (that is, the address component 40) when the amplitude of the detection output b exceeds that of the reference voltage $V_r$, and is supplied to the gate circuit 34.

The gate circuit 34 passes the binary signal c shown in FIG. 5(C) from the binarization circuit 37 only during the high-level period of the address interval signal d shown in FIG. 5(D) from the address interval signal generating circuit 33. Accordingly, a signal e shown in FIG. 5(E) is obtained from the gate circuit 34 and is supplied to the address information reproducing circuit 35. The signal e only includes an address component 40b corresponding to the address information ADR, and does not include the crosstalk component (noise component). After a predetermined address information is detected in the address information reproducing circuit 35, the predetermined address information is supplied to the system controller so as to make a predetermined access on the optical disc 10.

FIG. 8 shows a second embodiment of the address interval signal generating circuit 33. In FIG. 8, the address interval signal generating circuit 33 comprises an envelope detecting circuit 61 and a comparator 62. The detection output b shown in FIG. 9(A) from the detecting circuit 36 is supplied to the envelope detecting circuit 61 through a terminal 63. An output envelope detection signal g shown in FIG. 9(B) of the envelope detecting circuit 61 is supplied to one input terminal of the comparator 62, and a reference voltage $V_R$ indicated by a phantom line is supplied to the other input terminal of the comparator 62 through a terminal 64. The comparator 62 outputs an address interval signal d shown in FIG. 9(C) which is supplied to the gate circuit 34 through a terminal 65.

The detection output b comprises the address component 40 and the crosstalk component 41, and the envelope detection signal g comprises envelope portions 70 and 71 respectively corresponding to the address component 40 and the crosstalk component 41. However, the reference voltage $V_R$ is set to such a level that is slightly higher than the amplitude of the envelope portion 71 but is slightly lower than the amplitude of the envolope portion 70. Since the reference voltage $V_R$ is set as described above, the address interval signal d has a high level only for an interval corresponding to the envelope portion 70 (that is, the address component 40) when the amplitude of the envelope detection signal g exceeds that of the reference voltage $V_R$, and is supplied to the gate circuit 34.

According to the present embodiment of the address reproducing system, the crosstalk component 41 included in the source signal a, that is, the crosstalk component 43 included in the output binary signal c of the information detecting circuit 32 is eliminated in the gate circuit 34 by use of the address interval signal d generated from the address interval signal generating circuit 33. Only the address component 40b is supplied to the address information reproducing circuit 35, making it possible to carry out an accurate access to the desired address on the optical disc 10.

Although the described embodiment uses the optical disc 10 as the recording medium, the present invention is applicable to systems which use other kinds of recording mediums which have substantially parallel tracks pre-recorded with the address information with a predetermined period such that the problem of crosstalk occurs. In addition, the present invention is also applicable to the case where the recording medium is pre-recorded with a main information signal in addition to the address information.

Further, the present invention is not limited to these embodiments, but various variations and modifications may be made without departing from the scope of the present invention.

What is claimed is:

1. An information recording and/or reproducing apparatus which reproduces a pre-recorded address information from a recording medium when recording and/or reproducing a main information signal on and/or from the recording medium, said address information being pre-recorded on substantially parallel tracks of the recording medium with a predetermined period, said information recording and/or reproducing apparatus comprising:

first means for detecting a signal recorded on one track of the recording medium and for converting the signal detected into a reproduced signal;

second means for generating an address interval signal having a predetermined level during a time corresponding to an interval in which the address information is pre-recorded on the recording medium; and third means for generating an output signal when both the reproduced signal from said first means and the address interval signal from said second means are received by said third means by passing the reproduced signal from said first means only during a time period in which the address interval signal has the predetermined level so as to obtain only the address information reproduced from said one track.

2. An information recording and/or reproducing apparatus as claimed in claim 1 in which said second means derives the address interval signal from the reproduced signal which is received from said first means.

3. An information recording and/or reproducing apparatus as claimed in claim 1 in which said second means comprises a comparator supplied with the reproduced signal and a reference signal for comparing levels of the two signals, said reference signal having such a level that is higher than an amplitude of the address information reproduced as crosstalk from a track adjacent to said one track but is lower than an amplitude of the address information reproduced from said one track, and a retriggerable monostable multivibrator supplied with an output signal of said comparator for producing the address interval signal which has the predetermined level only during a time in which the amplitude of the reproduced signal exceeds that of the reference signal.

4. An information recording and/or reproducing apparatus as claimed in claim 1 in which said second means comprises an envelope detecting circuit for detecting an envelope of the reproduced signal, and a comparator supplied with an output envelope detection signal of said envelope detecting circuit and a reference signal for comparing levels of the two signals, said reference signal having such a level that is higher than an amplitude of the detected envelope corresponding to the address information reproduced as crosstalk from a track adjacent to said one track but is lower than an amplitude of the detected envelope corresponding to the address information reproduced from said one track, said comparator producing the address interval signal which has the predetermined level only during a time in which the amplitude of the detected envelope exceeds that of the reference signal.

5. An information recording and/or reproducing apparatus as claimed in claim 1 in which said recording medium is an optical disc comprising a spiral track made up of successive track turns constituting the substantially parallel tracks, said first means comprising an optical pickup device for reproducing information from said optical disc by use of a reproducing light beam which forms a light spot on said optical disc.

* * * * *